(12) United States Patent
Stripe

(10) Patent No.: US 6,293,312 B1
(45) Date of Patent: Sep. 25, 2001

(54) THERMOPLASTIC TUBING

(75) Inventor: Stanley E. Stripe, Hilliard, OH (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/575,946

(22) Filed: May 23, 2000

(51) Int. Cl.[7] ................................................ F16L 11/04
(52) U.S. Cl. .................. 138/141; 138/137; 138/DIG. 3; 138/140; 428/35.7; 428/36.91
(58) Field of Search .............................. 138/137, DIG. 3, 138/127, 125, 126, 141, 140; 428/36.91, 36.2

(56) References Cited

U.S. PATENT DOCUMENTS

| | | | |
|---|---|---|---|
| 3,166,688 | 1/1965 | Rowland et al. | 317/2 |
| 3,473,087 | 10/1969 | Slade | 317/2 |
| 3,561,493 | 2/1971 | Maillard et al. | 138/141 |
| 4,643,927 | 2/1987 | Luecke et al. | 428/36 |
| 4,887,647 | 12/1989 | Igarashi et al. | 138/126 |
| 5,038,833 | 8/1991 | Brunnhofer | 138/137 |
| 5,076,329 | 12/1991 | Brunnhofer | 138/137 |
| 5,170,011 | 12/1992 | Martucci | 174/47 |
| 5,383,087 | 1/1995 | Noone et al. | 361/215 |
| 5,419,374 | 5/1995 | Nawrot et al. | 138/137 |
| 5,588,469 | * 12/1996 | Kakiuchi et al. | 138/137 |
| 5,639,528 | * 6/1997 | Feit et al. | 138/137 X |
| 5,679,425 | * 10/1997 | Plumley | 138/137 X |
| 5,985,954 | * 11/1999 | Tsuchida et al. | 523/400 |
| 6,005,030 | * 12/1999 | Togawa et al. | 523/443 |
| 6,080,487 | * 6/2000 | Coggio et al. | 428/422 |
| 6,106,914 | * 8/2000 | Kanbe et al. | 138/137 X |
| 6,156,400 | * 12/2000 | Jing et al. | 428/35.7 |

FOREIGN PATENT DOCUMENTS

| | | |
|---|---|---|
| 0661094 A2 | 7/1995 | (EP) . |
| 0661094 A3 | 7/1995 | (EP) . |
| 0661094 B1 | 7/1995 | (EP) . |
| WO95/23036 | 8/1995 | (WO) . |

* cited by examiner

*Primary Examiner*—Patrick Brinson
(74) *Attorney, Agent, or Firm*—Joseph V. Tassone

(57) ABSTRACT

A thermoplastic tube for transfer of hydrocarbon fuel comprising an inner fluoroplastic layer and an outer polyamide layer bonded to the fluoroplastic layer wherein an adhesion promoter is included in at least one of the layers is disclosed. The adhesion promoter is an unsubstituted or substituted phenol salt of 1,8-diazabicyclo-[5,4,0]undec-7-ene on a novolac carrier which functions to increase the adhesive bond strength between the two layers. The adhesion promoter provides a chemically bonded adhesion in addition to the mechanical adhesion associated with extrusion or lamination of the layers.

27 Claims, 2 Drawing Sheets

THERMOPLASTIC TUBING

BACKGROUND OF THE INVENTION

The present invention relates generally to tubing and particularly to fuel transport tubing such as fuel filler and fuel filler neck tubing. More particularly, this invention relates to a thermoplastic tubing for transfer of hydrocarbon fuel comprising a fluoropolymer inner layer and a melt processible polyamide outer layer wherein at least one of the layers also includes an adhesion promoter which improves interlayer bonding.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, temperatures often rise to extremely high levels, and in cold climates, there is exposure to extremely low temperatures as well.

This abundance of considerations has led to design of tubing having multiple layers. The materials of each layer have specific, and preferably complementary, properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses tubing having two coextruded layers of different plastics, and a coextruded layer of adhesive therebetween. The layers are chosen from plastics having complementary properties. U.S. Pat. No. 4,643,927 to Luecke et al. discloses tubing having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows multi-layer tubing having an inner fluororubber layer that prevents degradation due to amine-type additives and also exhibits improved adhesion to an outside rubber layer. U.S. Pat. No. 5,038,833 to Brunnhofer discloses tubing having a protective outer polyamide layer, a middle alcohol barrier layer of polyvinyl-alcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. Nos. 3,166,688 to Rowand et al. and 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Most fluoropolymers having strong mechanical properties, for example, do not bond well with other fluoropolymers. Conversely, fluoropolymers exhibiting good bondability (polyvinylidene fluoride (PVDF), in particular) tend to be mechanically weak.

U.S. Pat. No. 5,383,087 to Noone et al. discloses an outer impact-resistant polyamide layer, an intermediate bonding layer, an inner permeation-resistant fluoroplastic layer, and an innermost conductive fluoroplastic layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can result in poor or variable degrees of adhesion. Furthermore, in many cases '(such as with corona treatment), only temporary bonding is achieved and delamination may occur with aging.

Accordingly, there is a need for an improved tubing for transfer of hydrocarbon fuels that provides the necessary durability and resistance to permeation through the utilization of a dual or multi-layer structure characterized by increased adhesive bond strength between the layers.

SUMMARY OF THE INVENTION

The present invention is a multi-layer thermoplastic tube for transfer of hydrocarbon fuel comprising an inner fluoroplastic layer and an outer polyamide layer bonded to the fluoroplastic layer wherein an adhesion promoter is included in at least one of the layers. The adhesion promoter is an unsubstituted or substituted phenol salt of 1,8-diazabicyclo-[5,4,0]undec-7-ene which functions to increase the adhesive bond strength between the two layers. The adhesion promoter provides a chemically bonded adhesion in addition to the mechanical adhesion associated with extrusion or lamination of the layers. The adhesion promoter increases the adhesion without adversely affecting the electrostatic dissipation properties of the tubing materials.

In a first embodiment of the invention, a thermoplastic multi-layer material comprising an inner layer of a thermoplastic form of a tetrafluoroethylene-hexafluoropropylene-vinylidene fluoride (THV) terpolymer and an outer layer of a melt processible polyamide bonded to said inner layer wherein at least one of the layers further comprises an adhesion promoter is provided. The adhesion promoter is an unsubstituted or substituted phenol salt of 1,8-diazabicyclo-[5,4,0]undec-7-ene (DBU). The multi-layer material is characterized by increased adhesive bonding between the layers as compared to a multi-layer material prepared without the adhesion promoter.

In a second embodiment of the invention, a tubing for transfer of hydrocarbon fuel having improved inter-layer bonding is provided. The tubing comprises an inner layer of a thermoplastic form of a tetrafluoroethylene-hexafluoropropylene-vinylidene fluoride terpolymer and an outer layer of a melt processible polyamide bonded to the inner layer wherein at least one of the layers further comprises an adhesion promoter comprising an unsubstituted or substituted phenol salt of 1,8-diazabicyclo-[5,4,0]undec-7-ene. The tubing not only exhibits improved resistance to delamination during forming and flexing, but also provides the necessary levels of impermeability to fuel vapors and is relatively inexpensive to produce.

In a first manifestation of the tubing of the present invention, the tubing structure comprises an inner barrier layer comprising a thermoplastic form of THV and an outer protective cover adjacent to and surrounding the barrier layer comprising a melt processible polyamide and an adhesion promoter comprising an unsubstituted or substituted phenol salt of 1,8-diazabicyclo-[5,4,0]undec-7-ene.

In a second manifestation of the tubing of the present invention, the tubing structure comprises an inner barrier layer comprising a thermoplastic form of THV and an adhesion promoter comprising an unsubstituted or substituted phenol salt of 1,8-diazabicyclo-[5,4,0]undec-7-ene on a novolac carrier and an outer protective cover adjacent to and surrounding the barrier layer comprising a melt processible polyamide.

In a third manifestation of the invention, the tubing structure comprises an inner barrier layer comprising a thermoplastic form of THV and an adhesion promoter comprising an unsubstituted or substituted phenol salt of 1,8-diazabicyclo-[5,4,0]undec-7-ene and an outer protective cover adjacent to and surrounding the barrier layer comprising a melt processible polyamide and an adhesion promoter comprising an unsubstituted or substituted phenol salt of 1,8-diazabicyclo-[5,4,0]undec-7-ene.

The present invention also provides a method for improving the bond strength between a fluoroplastic material and a melt processible polyamide material comprising the steps of: providing a fluoroplastic material comprising a thermoplastic form of a tetrafluoroethylene-hexafluoropropylene-vinylidene fluoride terpolymer; providing a melt processible polyamide; mixing an adhesion promoter comprising an unsubstituted or substituted phenol salt of 1,8-diazabicyclo-[5,4,0]undec-7-ene with at least one of the fluoroplastic material or the melt processible polyamide material; and forming a multi-layer article comprising a layer made of the fluoroplastic material contacting a layer made of the melt processible polyamide material. The adhesion promoter is present in an amount sufficient to increase the adhesive bond strength between the two layers.

The methods and compositions of this invention are particularly useful for making multi-layer articles such as tubing and hoses suitable for conveying hydrocarbon fuels. The tubing, when employed in fuel transport hoses, provides increased inter-layer bonding and low permeability to hydrocarbon fuel vapors.

DETAILED DESCRIPTION

Figure 1:
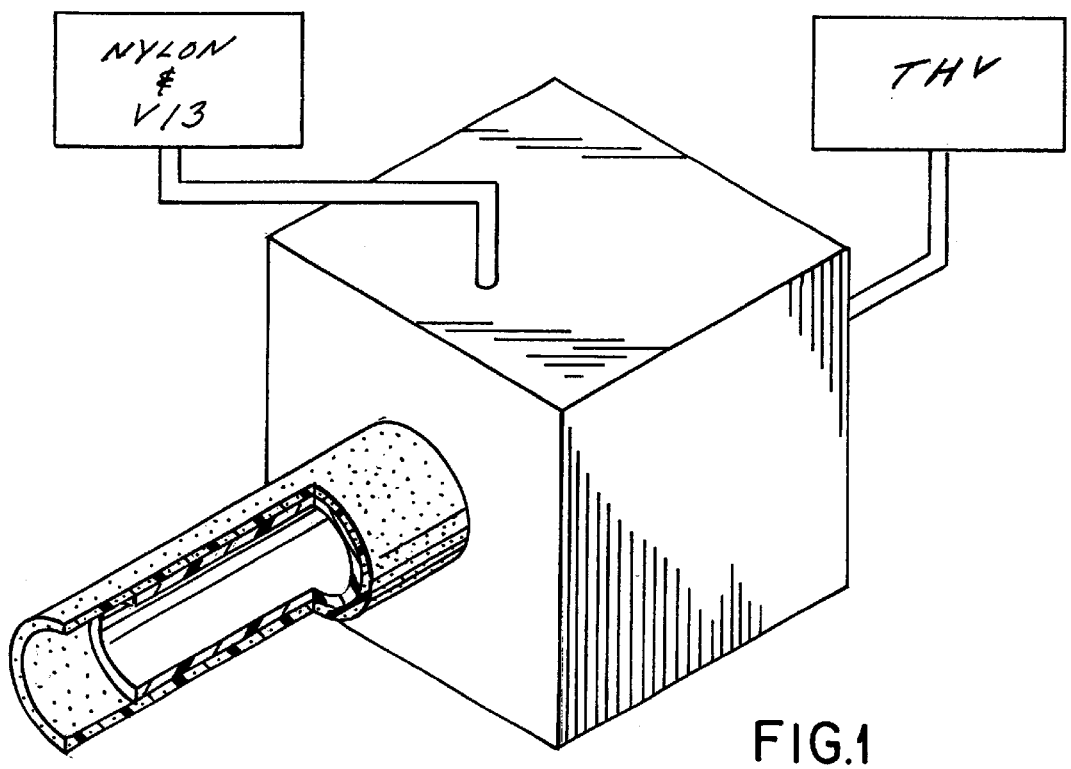
FIG. 1 is a schematic representation illustrating a method for producing a tubing according to one embodiment of the present invention.

The present invention is a thermoplastic tube 10 suitable for transfer of hydrocarbon fuel. The thermoplastic tube 10 of the invention includes an inner fluoroplastic layer 12 and an outer polyamide layer 14 bonded to the fluoroplastic layer 12. At least one of the layers 12, 14 also includes an adhesion promoter 16 which functions to increase the adhesive bond strength between the two layers. The adhesion promoter 16 is an unsubstituted or substituted phenol salt of 1,8-diazabicyclo-[5,4,0]undec-7-ene. The adhesion promoter provides a chemically bonded adhesion in addition to the mechanical adhesion associated with extrusion or lamination of the layers.

The drawings and the following detailed description are directed primarily to a two layer tubing corresponding to a preferred embodiment of the present invention. However, it is not beyond the scope of the invention to include one or more additional layers to produce a multi-layer article or tubing having three or more layers.

FIG. 1 is a schematic representation illustrating the general scheme for producing a thermoplastic multi-layer article or tubing 10 in accordance with the present invention. FIG. 1 illustrates an embodiment of the present invention wherein starting materials including a fluoroplastic material containing an adhesion promoter and a melt processible polyamide material are used to form a multi-layer article or tubing 10. Various methods known in the art can be used to produce a bonded multi-layer article or tubing 10 wherein the inner fluoroplastic layer 12 is bonded to the outer polyamide layer 14. For instance, it is believed that the fluoroplastic and polyamide can be formed by known methods into thin film layers. The fluoroplastic layer 12 and the polyamide layer 14 can then be laminated together under heat and/or pressure to form a bonded, multi-layer article 10. Alternatively, the fluoroplastic layer 12 and the polyamide layer 14 are co-extruded into a multi-layer article or tubing 10.

Figure 2:
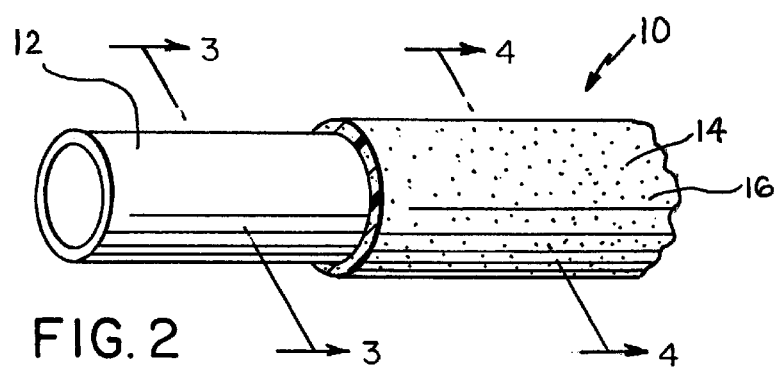
FIG. 2 is a perspective cutaway view of a tubular member illustrating a first manifestation of the present invention.
Figure 3:
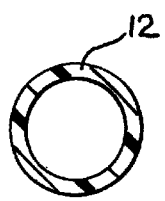
FIG. 3 is a cross-sectional view along line 3—3 in FIG. 2.
Figure 4:
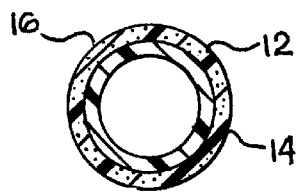
FIG. 4 is a cross-sectional view along line 4—4 in FIG. 2.

FIGS. 2, 3 and 4 illustrate a preferred manifestation of the present invention wherein a tubing 10 comprises an inner barrier layer 12 forming the interior wall of the tubing 10 and an outer cover 14 as the exterior protective surface of the tubing 10. The inner layer comprises a thermoplastic form of a THV terpolymer. The outer cover 14 comprises a melt processable polyamide and an adhesion promoter 16.

Figure 5:
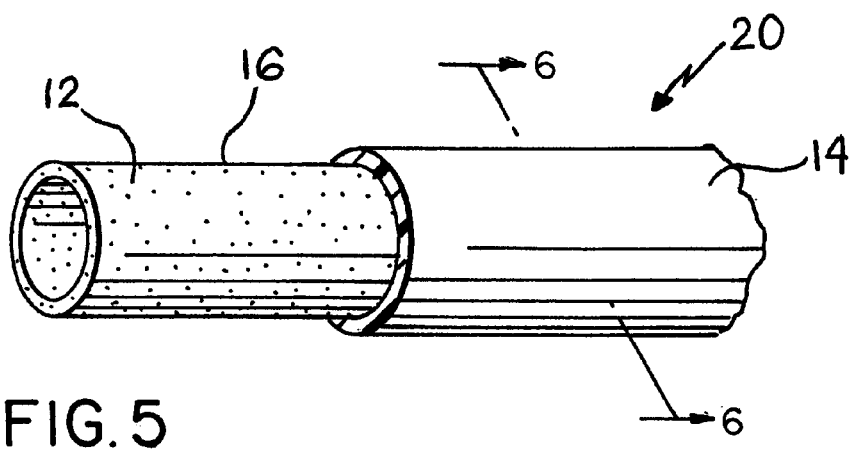
FIG. 5 is a perspective cutaway view of a tubular member which illustrates another manifestation of the present invention.
Figure 6:
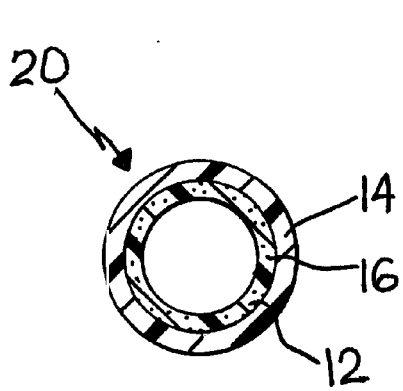
FIG. 6 is a cross-sectional view along line 6—6 in FIG. 5.

FIGS. 5 and 6 illustrate a second manifestation wherein a tube 20 comprises an inner barrier layer 12 forming the interior wall of the tube 20 and an outer cover 14 as the exterior protective surface of the tube 20. The inner layer comprises a thermoplastic form of a THV terpolymer and an adhesion promoter 16. The outer cover 14 comprises a melt processable polyamide.

Figure 7:
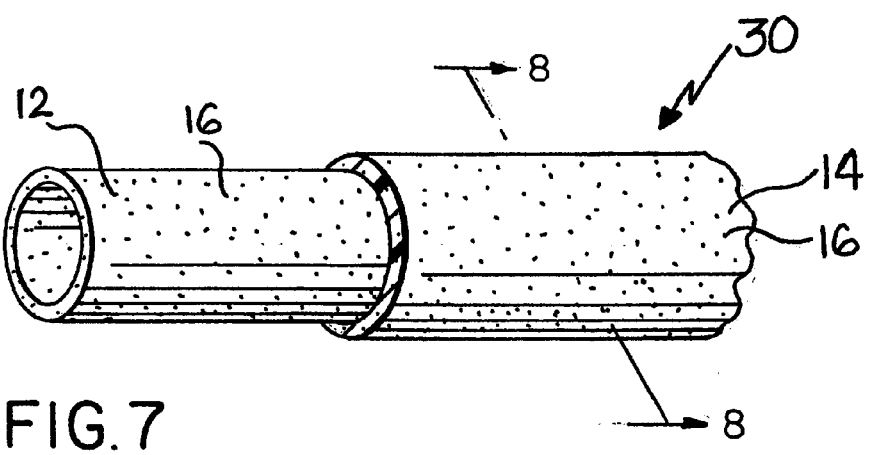
FIG. 7 is a perspective cutaway view of a tubular member which illustrates another manifestation of the present invention.
Figure 8:
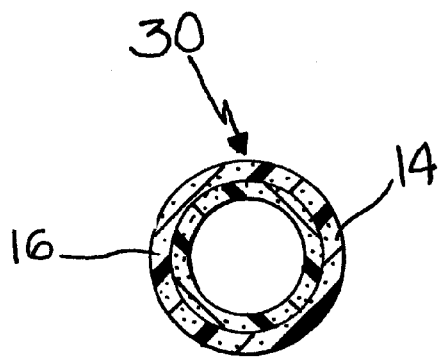
FIG. 8 is a cross-sectional view along line 8—8 in FIG. 7.

A third manifestation of the invention is illustrated in FIGS. 7 and 8 where the tube 30 comprises an inner barrier layer 12 forming the interior wall of the tube 30 and an outer cover 14 forming the exterior protective surface of the tube 30. The inner layer 12 comprises a thermoplastic form of a THV terpolymer and an adhesion promoter 16. The outer cover 14 comprises a melt processable polyamide and an adhesion promoter 16.

The term "hydrocarbon" as used herein is meant to include fuels such as gasoline, oils, air conditioning gases, organic chemicals, and the like.

The inner barrier layer 12 of the invention is formed from a fluoroplastic terpolymer comprised of the monomers tetrafluoroethylene, hexafluoropropylene and vinylidene fluoride. The tetrafluoroethylene-hexafluoropropylene-vinylidene fluoride fluoroplastic terpolymer is a fluorothermoplastic such as Dyneon THV, which is commercially available from Dyneon. The THV terpolymer useful in the present invention exhibits improved gasoline permeation resistance. Typically, the thickness of the barrier layer 12 is about 5 to 25 mils, preferably about 13 to 14 mils.

The outer cover 14 of the tubing is a protective layer of a melt processable polyamide having good heat resistance, oil resistance, weather resistance and flame resistance. Polyamides useful as the protective outer layer are generally commercially available. For example, polyamides such as any of the well-known Nylons are available from a number of sources. Particularly preferred polyamides are nylon 6, nylon 6-6, nylon 11, or nylon 12. It should be noted that the selection of a particular polyamide material should be based upon the physical requirements of the particular application for the resulting article. For example, nylon 6 and nylon 6-6 offer higher heat resistant properties than nylon 11 or nylon 12, whereas nylon 11 and nylon 12 offer better chemical resistant properties. In addition to those polyamide materials, other nylon material such as nylon 6,12, nylon 6,9, nylon 4, nylon 4,2, nylon 4,6, nylon 7, and nylon 8 may also be used. Ring containing polyamides, e.g., nylon 6,T and nylon 6,I, may also be used. Polyether containing polyamides, such as Pebax™ polyamines, may also be used.

The adhesion promoter 16 of the present invention improves inter-layer adhesion between the inner barrier layer 12 and the outer protective layer 14. The adhesion promoter 16 of the invention is an unsubstituted or substituted phenol salt of 1,8-diazabicyclo-[5,4,0]undec-7-ene (DBU). The salt can be obtained by adding a compound having a phenolic hydroxyl group such as phenol, cresol or the like to DBU. The preferred adhesion promoters are salts of phenol novolac resin with 1,8-diazabicyclo-[5,4,0]undec-7-ene having a total amine value of approximately 102 to 118 and a softening point of about 125° C. to 146° C. The adhesion promoter 16 is uniformly dispersed within at least one of the thermoplastic THV composition or the melt processable polyamide composition used to produce the inner barrier layer and outer protective layer, respectively. Preferably, a layer of the tubing modified with the adhesion promoter contains from about 0.1 to 3 phr of the adhesion promoter.

As is common practice in the industry, one or more layers of the tubing can be made conductive to prevent the buildup of static electricity generated by the flow of fuel along the inner surface of the hose. Such a build up of static electricity over time has been known to cause the formation of pin holes in the hose allowing the fuel to leak out through the holes. Typically, the inner barrier layer 12 or the outer layer 14 is made conductive by compounding the layer material with carbon black or other industry recognized ingredients to provide conductivity to the barrier layer. While the amount of carbon black added is not critical, excess carbon black tends to make the material more difficult to process. In vapor or vent applications, the innermost layer of the hose need not be conductive. Unlike some prior art methods for improving inter-layer bonding which can deleteriously affect the electrostatic dissipative properties of the tubing, the adhesion promoter and processing conditions of the present invention do not interfere with the electrostatic dissipative properties of the tubing.

The methods of producing the fuel transfer tubing of the present invention are known in the art. For example, thin film lamination, separate extrusion, tandem extrusion, or coextrusion processes may be used. For versatility and cost reasons, the preferred methods for producing the hydrocarbon transfer tubing of the present invention are separate extrusion and tandem extrusion.

Production of the preferred embodiment of the present invention is as follows. First, a twin screw extruder is used to mix\disperse the adhesion promoter (V-13) at a concentration of 0.1 to 3 phr with a melt processable polyamide selected from the group consisting of Nylon 6, Nylon 6-6, Nylon 11 and Nylon 12. The resulting composition is pellitized and used as a protective cover or veneer layer in a coextruded tube over an inner THV layer.

Alternatively, a tubing incorporating the adhesion promoter in the inner barrier layer can be produced as follows. First, the adhesion promoter is blended with the THV composition at a concentration of 0.1 to 3 phr. Then, the modified THV and a melt processable polyamide are coextruded using two extruders and a coextrusion die which extrudes both materials simultaneously to form the tubing according to another embodiment of the present invention.

One of the advantages of the thermoplastic tubing of the present invention is that the outer layer may be directly bonded to the inner barrier layer without the need for an intermediate tie layer. Presence of the adhesion promoter in tone or both layers of the tubing provides improved inter-layer bonding strength which produces a tube resistant to delamination during forming or use.

The tube of the invention may optionally include a reinforcing member which affords physical strength to the finished tubing. Typically, the reinforcing member is selected from a group consisting of glass fibers, cotton fibers, polyamide fibers, polyester fibers, and rayon fibers. Preferably, the reinforcing material is an aromatic polyamide such as Kevlar or Nomex both of which are manufactured by DuPont. The reinforcing material may be either knitted, braided, or spiraled to form the reinforcing member. Alternatively, the reinforcing material may be chopped and added to the nylon.

Other additives such as antioxidants, processing aids, etc. can be employed in carrying out the present invention and it is within the scope of this invention to incorporate herein any such additives as commonly used in making fuel line tubing.

The THV barrier layer of the present invention is useful in reducing the permeability of fuel vapors from the fuel transfer tube; however, it is also useful in reducing the permeability of chemical vapors such as in air conditioning hoses, oil hoses, and the like where severe chemical resistance or vapor permeation resistance is required.

Having described the invention in detail and by reference to preferred embodiments thereof, it will be apparent that modifications and variations are possible without departing from the scope of the invention defined in the appended claims.

What is claimed is:

1. A thermoplastic tube for transfer of hydrocarbon fuel comprising:
    an inner layer comprising a thermoplastic form of a tetrafluoroethylene-hexafluoropropylene-vinylidene fluoride terpolymer; and
    an outer layer comprising a melt processable polyamide bonded to said inner layer
    wherein at least one of the layers further comprises an adhesion promoter comprising an unsubstituted or substituted phenol salt of 1,8-diazabicyclo-[5,4,0]undec-7-ene on a novolac carrier.

2. The tubing of claim 1 wherein said thermoplastic tube is a two layer tube.

3. The tubing of claim 2 wherein said adhesion promoter is present in said inner layer at a concentration of from about 0.1 to 3 phr.

4. The tubing of claim 1 wherein said adhesion promoter is present in said outer layer.

5. The tubing of claim 4 wherein said adhesion promoter is present in said outer layer at a concentration of from about 0.1 to 3 phr.

6. The tubing of claim 1 wherein said adhesion promoter is present in both of said inner and outer layers.

7. The tubing of claim 6 wherein said adhesion promoter is present at a concentration of from about 0.1 to 3 phr.

8. The tubing of claim 7 further comprising a conductive material.

9. The tubing of claim 8 wherein said conductive material is carbon black.

10. The tubing of claim 1 wherein said melt processable polyamide is selected from the group consisting of Nylon 6, Nylon 6-6, Nylon 11 and Nylon 12.

11. A thermoplastic multi-layer material comprising:
    an inner layer of a thermoplastic form of a tetrafluoroethylene-hexafluoropropylene-vinylidene fluoride terpolymer; and
    an outer layer of a melt processable polyamide bonded to said inner layer
    wherein at least one of the layers further comprises an adhesion promoter, the adhesion promoter being an unsubstituted or substituted phenol salt of 1,8-diazabicyclo-[5,4,0]undec-7-ene on a novolac carrier.

12. The thermoplastic multi-layer material of claim 11 wherein said adhesion promoter is present in said inner layer.

13. The thermoplastic multi-layer material of claim 12 wherein said adhesion promoter is present in said inner layer at a concentration of from about 0.1 to 3 phr.

14. The thermoplastic multi-layer material of claim 11 wherein said adhesion promoter is present in said outer layer.

15. The thermoplastic multi-layer material of claim 14 wherein said adhesion promoter is present in said outer layer at a concentration of from about 0.1 to 3 phr.

16. The thermoplastic multi-layer material of claim 11 wherein said adhesion promoter is present in both of said inner and outer layers.

17. The thermoplastic multi-layer material of claim 6 wherein said adhesion promoter is present at a concentration of from about 0.1 to 3 phr.

18. The thermoplastic multi-layer material of claim 17 further comprising a conductive material.

19. The thermoplastic multi-layer material of claim 18 wherein said conductive material is carbon black.

20. The thermoplastic multi-layer material of claim 11 wherein said melt processable polyamide is selected from the group consisting of Nylon 6, Nylon 6-6, Nylon 11 and Nylon 12.

21. A method for improving the bond strength between a fluoroplastic material and a melt processable polyamide material comprising the steps of:
    providing a fluoroplastic material comprising a thermoplastic form of a tetrafluoroethylene-hexafluoropropylene-vinylidene fluoride terpolymer;
    providing a melt processable polyamide;
    mixing an adhesion promoter comprising an unsubstituted or substituted phenol salt of 1,8-diazabicyclo-[5,4,0]undec-7-ene on a novolac carrier with at least one of the fluoroplastic material or the melt processable polyamide material; and
    forming a multi-layer article comprising a layer made of the fluoroplastic material contacting a layer made of the melt processable polyamide material.

22. The method of claim 21 wherein the melt processable polyamide is selected from the group consisting of Nylon 6, Nylon 6-6, Nylon 11 and Nylon 12.

23. The method of claim 22 wherein said adhesion promoter is present in said melt processable polyamide at a concentration of from about 0.1 to 3 phr.

24. The method of claim 21 wherein said step of forming a multi-layer article comprises co-extrusion of the two layers.

25. The method of claim 21 further comprising the step of adding a conductive material to at least one of said fluoroplastic material and said polyamide material.

26. The method of claim 25 wherein said multi-layer article is a thermoplastic tube for transfer of hydrocarbon fuel, said tube having an inner tubular layer made of said fluoroplastic material and an outer tubular layer made of said polyamide material, said conductive material being added to said inner fluoroplastic layer.

27. The method of claim 26 wherein said conductive material is carbon black.

* * * * *